United States Patent [19]
Morris et al.

[11] Patent Number: 5,534,368
[45] Date of Patent: Jul. 9, 1996

[54] BATTERY MODULE

[76] Inventors: Jerry L. Morris, 207 Vineyard Dr., San Jose, Calif. 95119; Michael E. McAleavey, 559 Gettysburg Dr., San Jose, Calif. 95123; S. Scot Cheu, 3858 Heppner La., San Jose, Calif. 95136

[21] Appl. No.: 241,879

[22] Filed: May 12, 1994

[51] Int. Cl.⁶ .................................................. H01M 6/46
[52] U.S. Cl. ........................ 429/152; 429/162; 429/192
[58] Field of Search .................................. 429/192, 162, 429/178, 152

[56] References Cited

U.S. PATENT DOCUMENTS 5,300,373  4/1994  Shackle ................................. 429/152
5,360,684  11/1994  Duval et al. ......................... 429/162

*Primary Examiner*—John S. Maples

[57] ABSTRACT

A battery module has a current collecting spacer positioned between two sides of a folded laminate including a first electrode layer. Top and bottom opposite electrode layers, of opposite polarity from the first electrode layer, are formed on the top and bottom of the folded laminate such that, when the opposite electrode layers and the folded laminate are compressed around the spacer, each opposite electrode layer forms, with a portion of the folded laminate, a substantially planar surface. A method for making the battery module is also described.

17 Claims, 8 Drawing Sheets

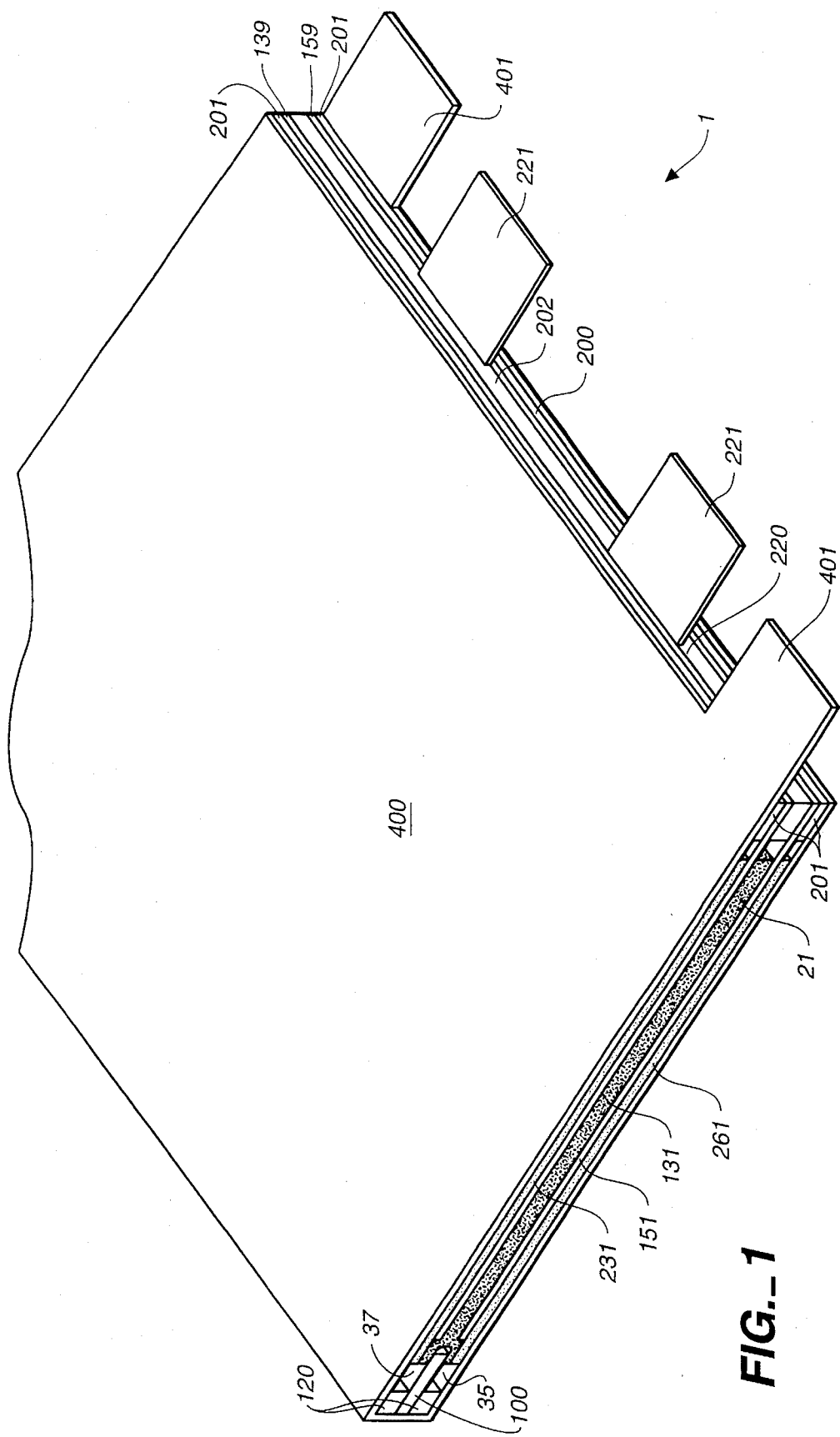
FIG._1

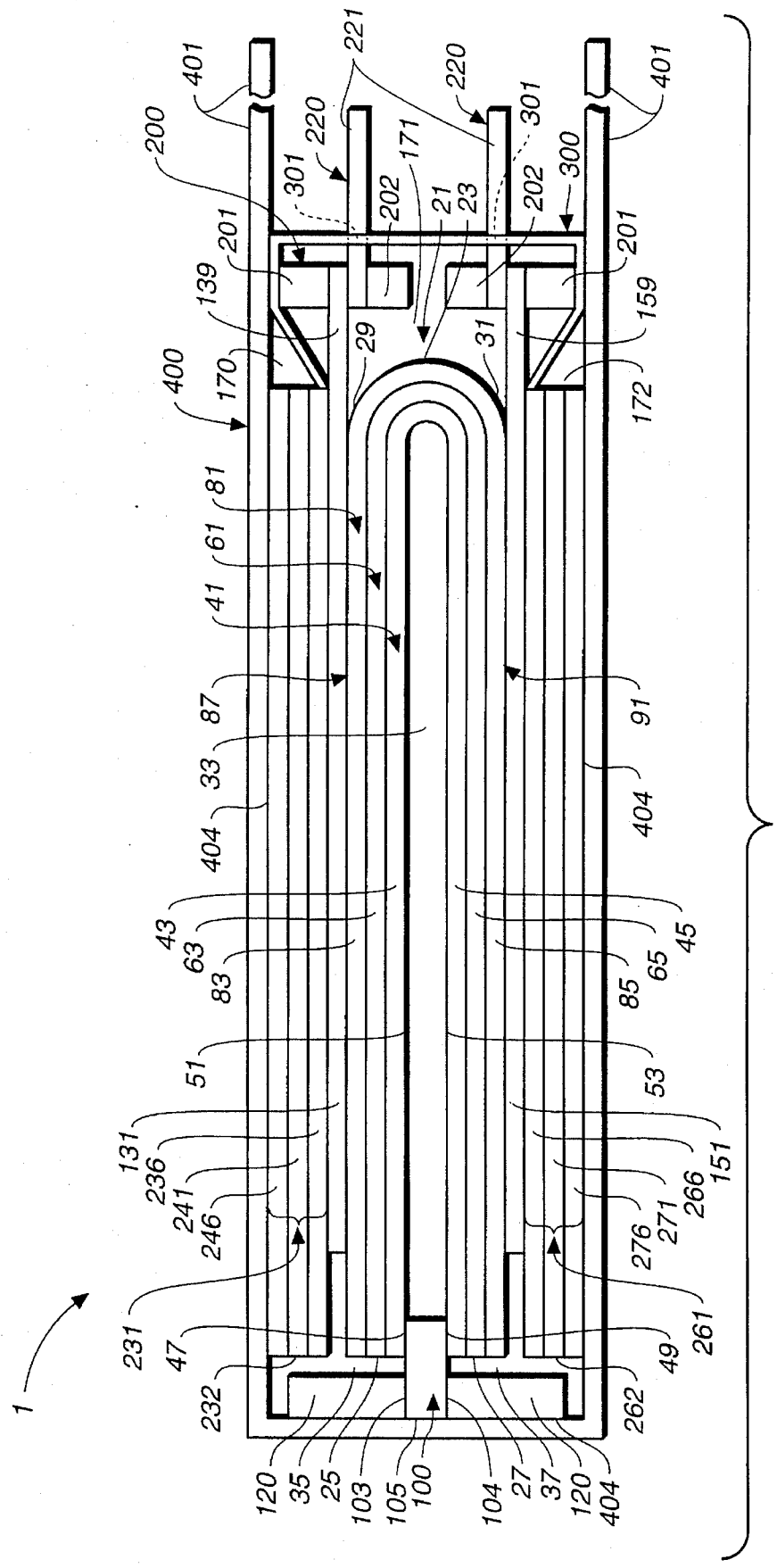
FIG._2

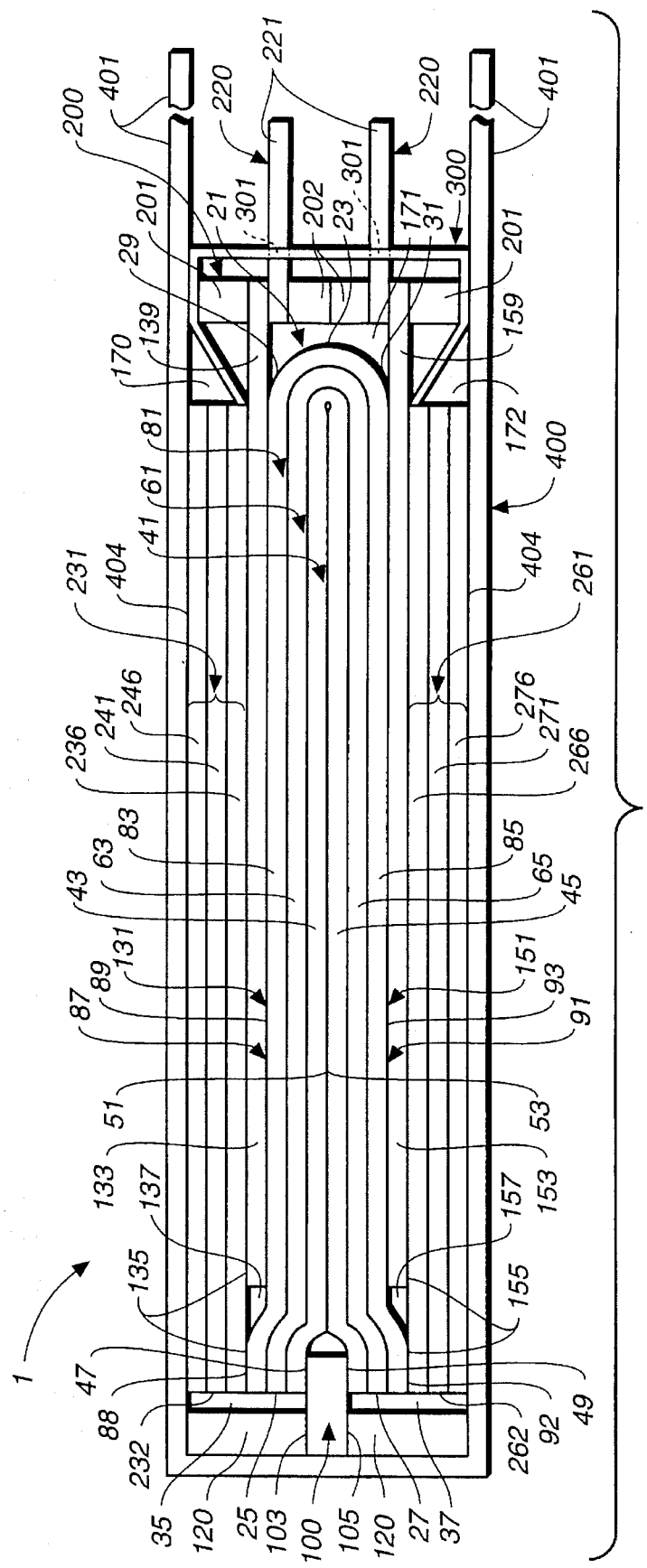
FIG._3

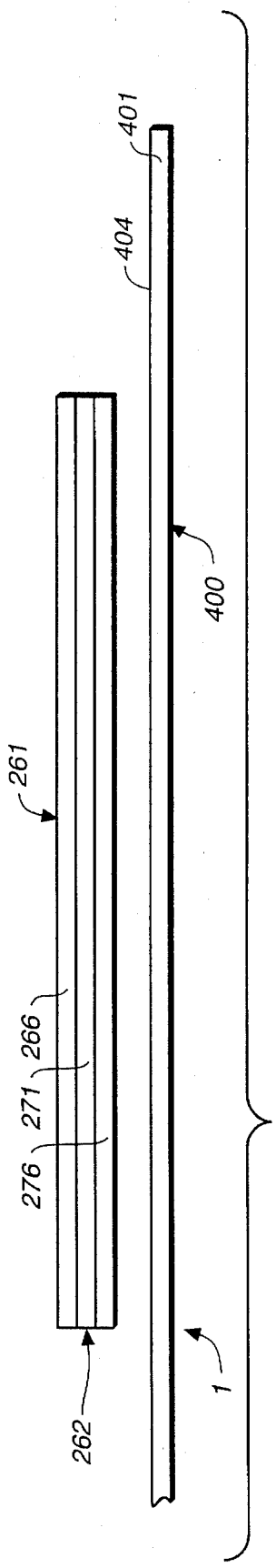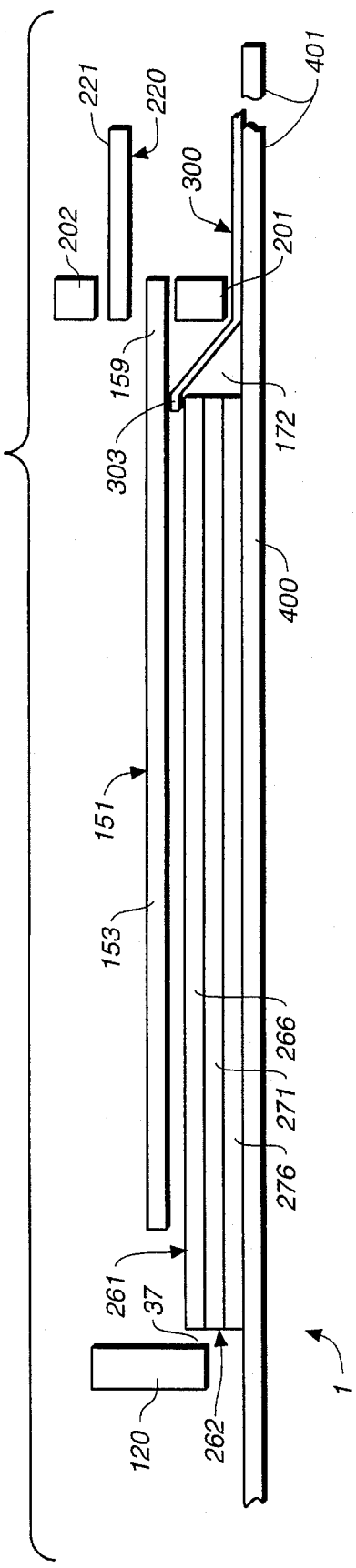

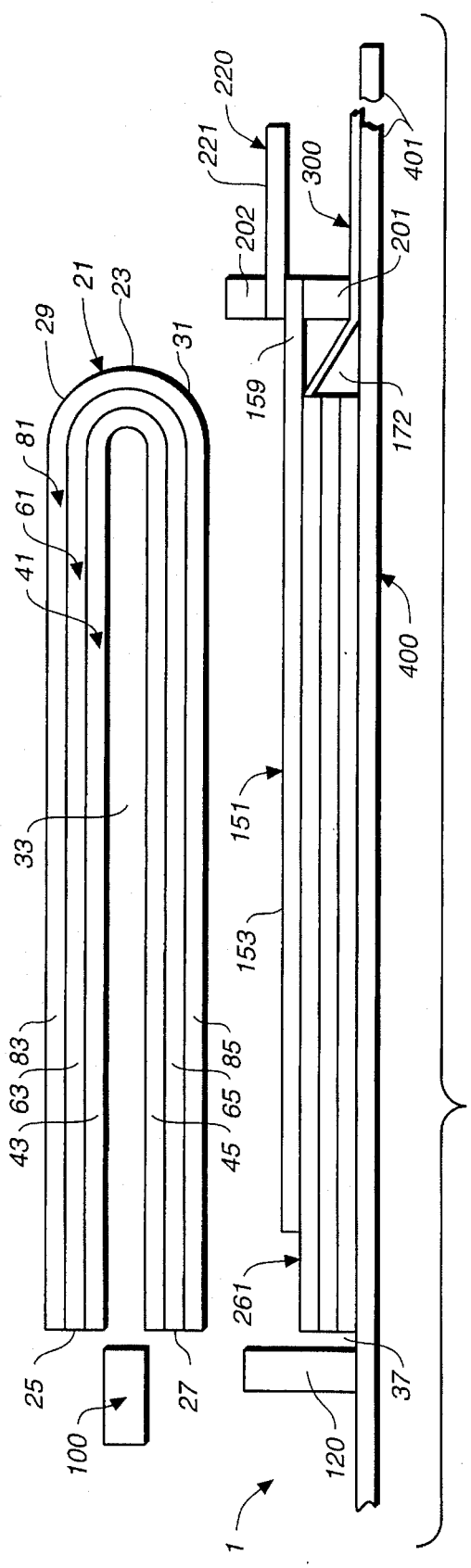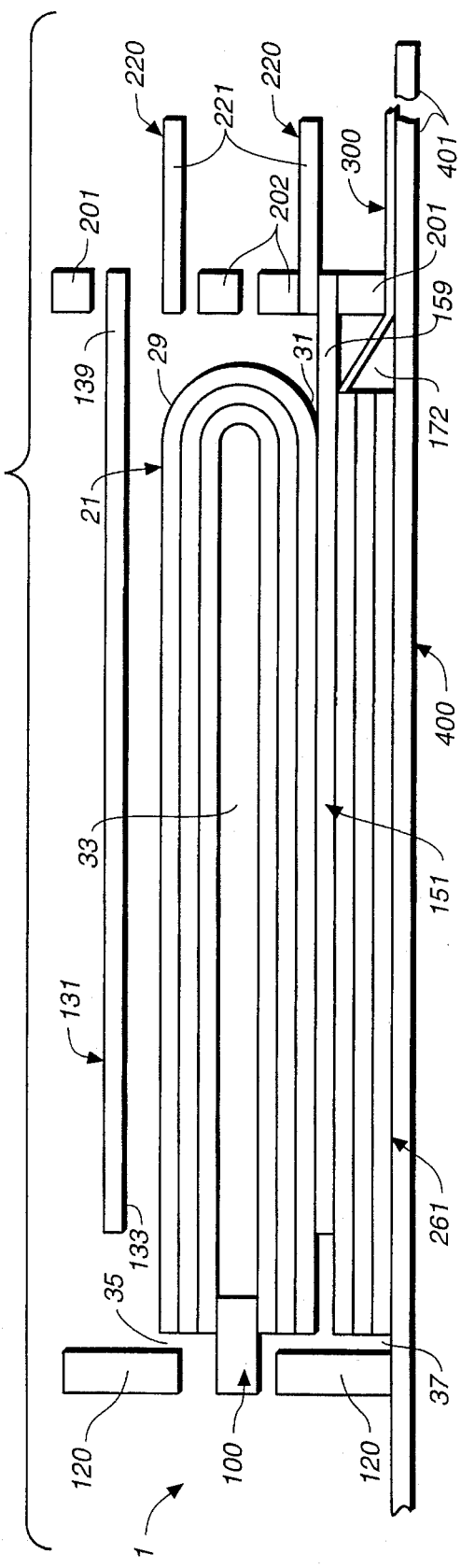

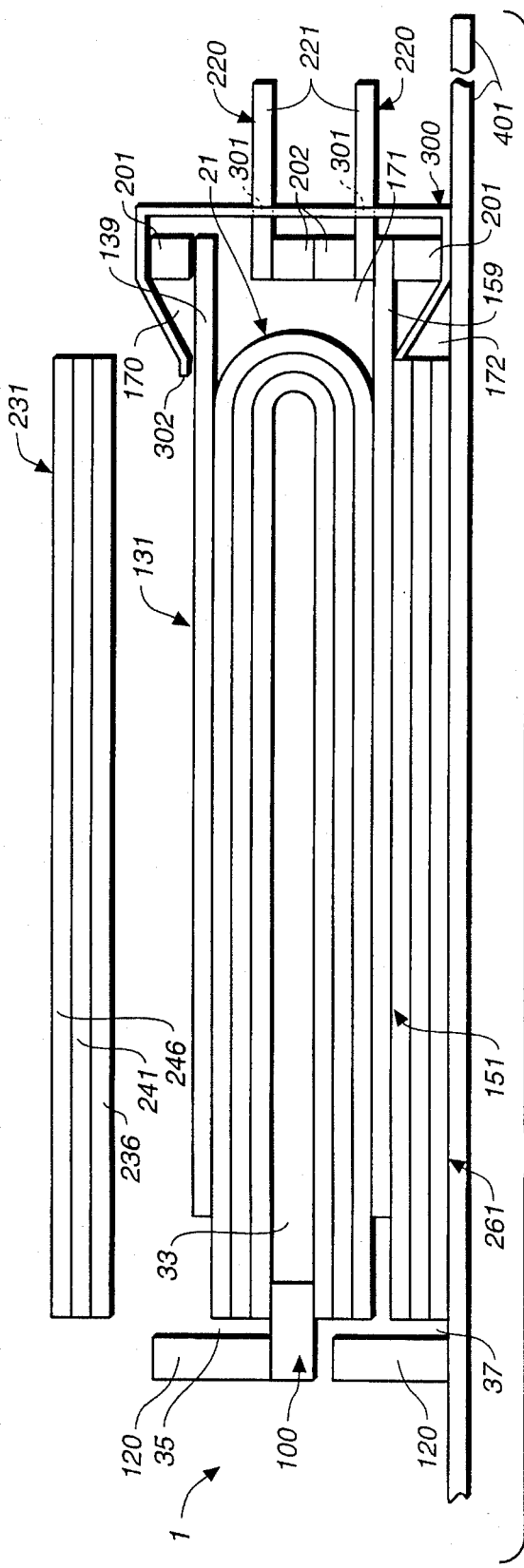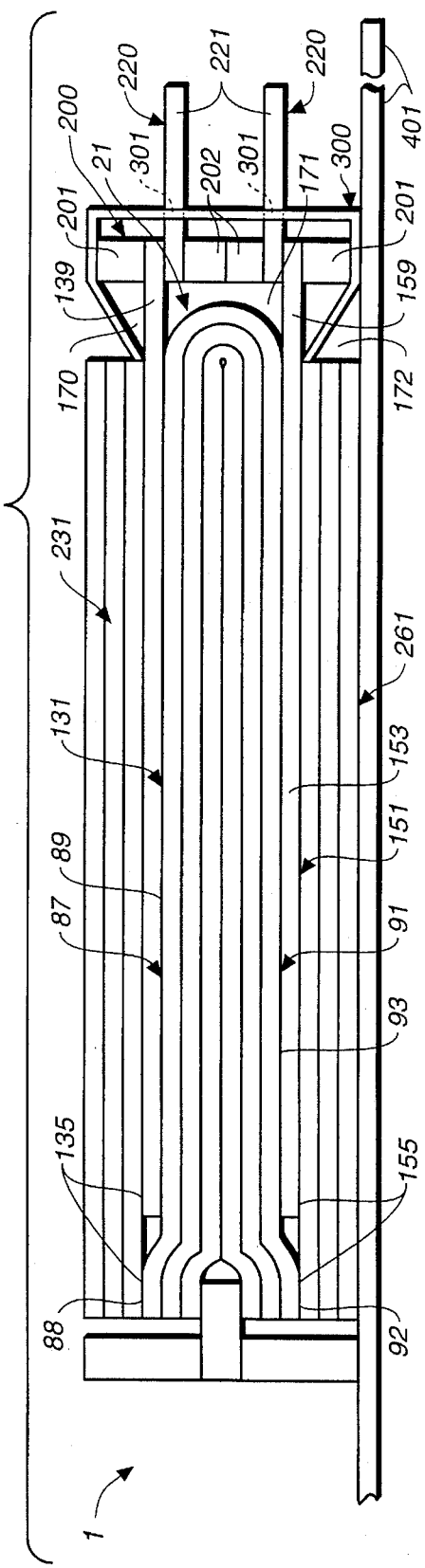

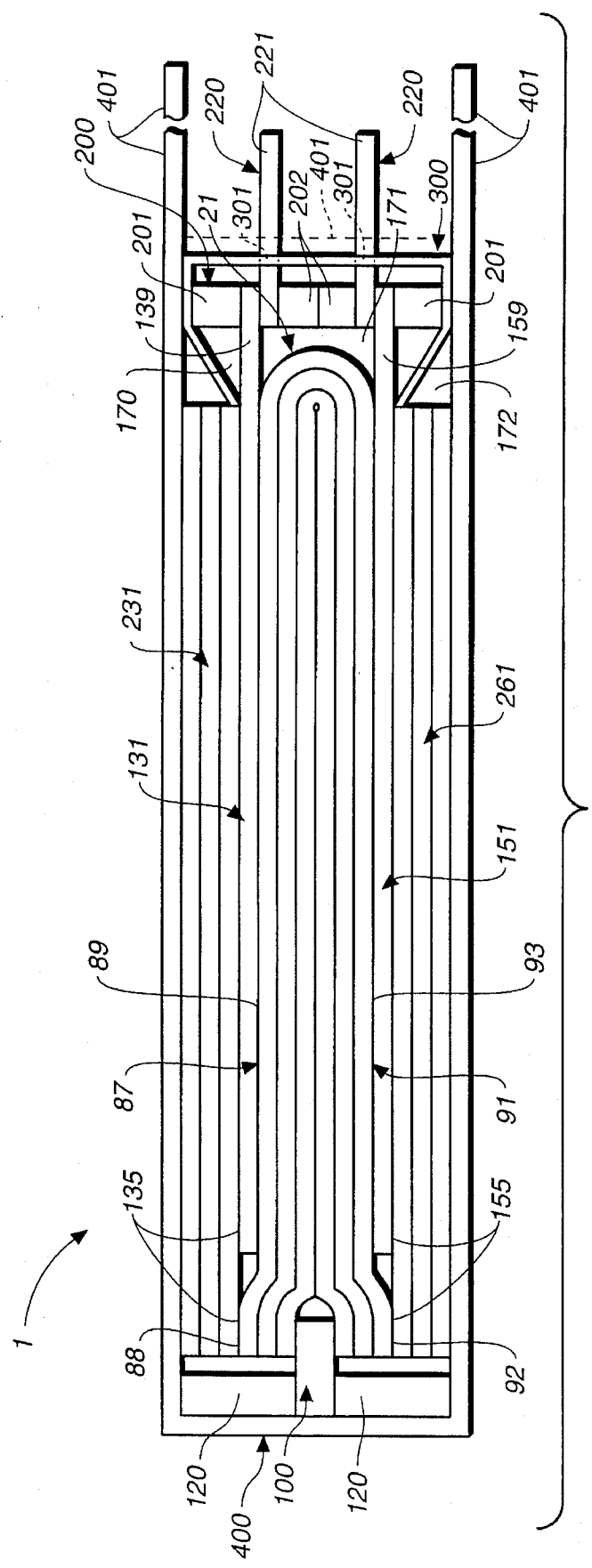
FIG._10

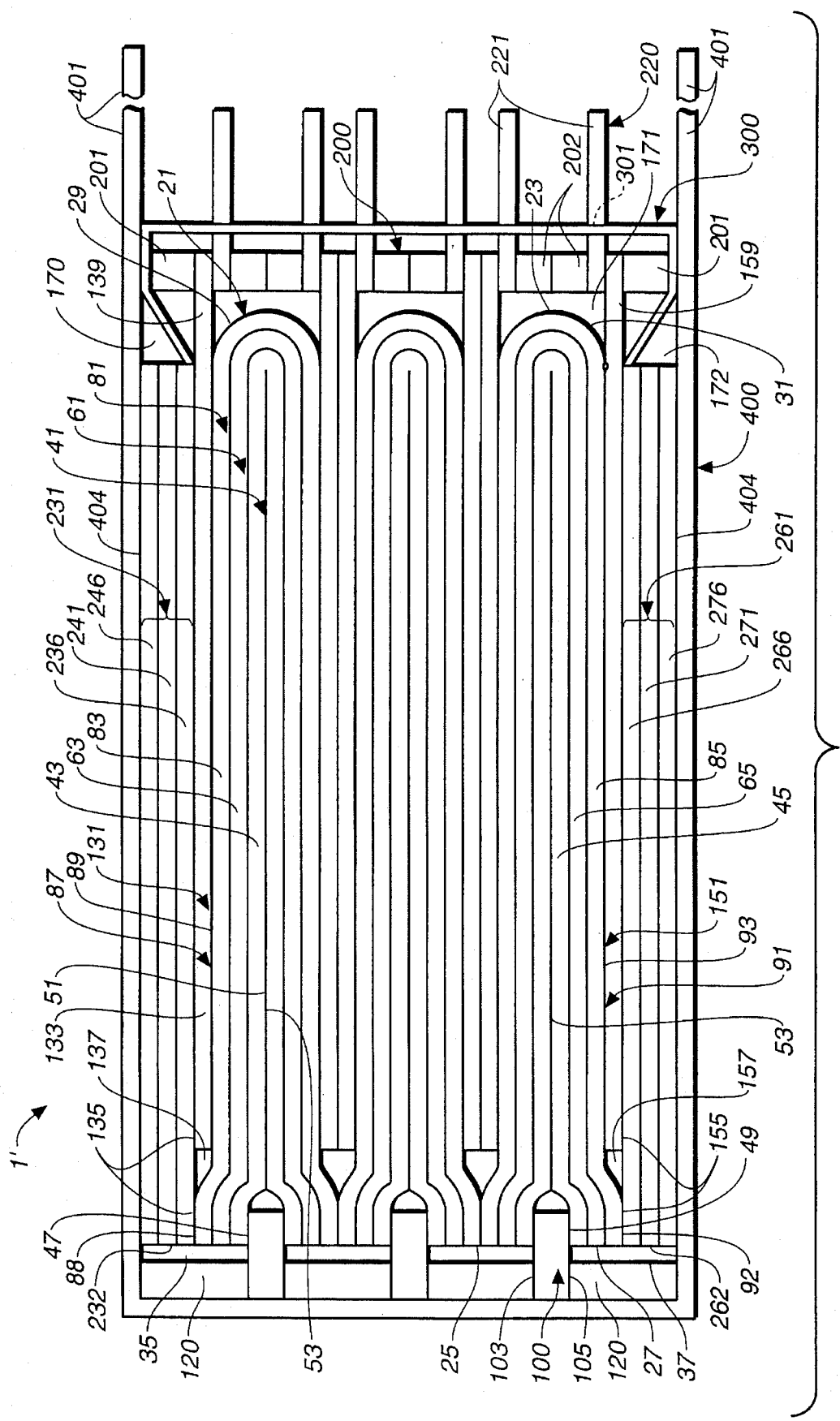
FIG._11

BATTERY MODULE

BACKGROUND OF THE INVENTION

1. Field of the Invention

The present invention relates to batteries and, more particularly, relates to batteries of the type having a folded cathode and electrolyte laminate.

2. State of the Art

In recent years workers in the battery art have begun to understand the advantages of manufacturing batteries that have polymer electrolytes and sheet-like cathodes and anodes. The advantages include lower battery weights than batteries that employ liquid electrolytes, longer service life, relatively high power densities, relatively high specific energies, and elimination of the danger of acid spillage.

In fabricating batteries, it is necessary to connect an anode to an anode current collector and a cathode to a cathode current collector. In batteries of the type that have a thin polymer electrolyte and sheet-like anode and cathode layers, the connection of current collectors presents a particular difficulty. For example, if current collectors are connected to each anode and cathode layer by conducting leads, localized raised portions are formed at each layer, resulting in deformation of the battery shape. Thus, as each anode and cathode layer is repeated, each having its own current collector, an increasingly deformed stack is formed.

SUMMARY OF THE PRESENT INVENTION

The present invention, generally speaking, provides a battery that uses a polymer electrolyte in lieu of a liquid electrolyte to attain desired operating characteristics in a small, light-weight battery.

More particularly, the present invention provides a battery module including a) a spacer means for current collection, b) a first laminate having a first electrode side that has a first polarity and a polymer electrolyte side, the first laminate being compressed around the spacer means such the first electrode side contacts the spacer means and a raised area and a recessed area are formed on the polymer electrolyte side; and c) a second electrode having a second polarity and having first and second sides, the second electrode being received in the recessed area such that the first side of the second electrode contacts the polymer electrolyte side.

Further, the present invention provides a method for making a battery module, which method comprises the steps of: a) folding a laminate means to form a folded edge, the laminate means having an electrolyte layer, an electrode layer, and a current collector layer, the fold being made such that a first portion of a first and a second half of the current collector layer face each other, and a first and second end of the folded laminate are aligned; b) placing the folded laminate means around a spacer means such that the spacer means contacts with a second portion of the first and second half of the current collector layer; c) applying a first portion of a first opposite electrode layer to a first portion of the first half of the electrolyte layer, and a first portion of a second opposite electrode layer to a first portion of the second half of the electrolyte layer; d) applying a first end laminate means to the first opposite electrode layer, and a second end laminate means to the second opposite electrode layer, the first and second end laminate means having an electrolyte layer, such that the electrolyte layers of the first and second end laminate means contact the first portion of the first opposite electrode layer and the first portion of the second opposite electrode layer; and e) compressing the first and second end laminate means such that a first and a second recessed portion and a first and a second raised portion of the first and second half of the electrolyte layer of the folded laminate means are formed and correspond to the location of the spacer means between the folded laminate means with the first portion of the first opposite electrode layer and the first portion of the second opposite electrode layer being received in the first and second recessed portions.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a schematic perspective view of a battery module according to an embodiment of the present invention;

FIG. 2 is an enlarged schematic side elevational view of an uncompressed, assembled battery module according to an embodiment of the present invention;

FIG. 3 is an enlarged schematic side elevational view of an assembled battery module according to an embodiment of the present invention;

FIG. 4 is a schematic exploded side elevational view of a portion of a partially assembled battery module according to an embodiment of the present invention during an initial assembly step;

FIG. 5 is a schematic exploded side elevational view of a portion of a partially assembled battery module according to an embodiment of the present invention during an assembly step following that of FIG. 4;

FIG. 6 is a schematic exploded side elevational view of a portion of a partially assembled battery module according to an embodiment of the present invention during an assembly step following that of FIG. 5;

FIG. 7 is a schematic exploded side elevational view of a portion of a partially assembled battery module according to an embodiment of the present invention during an assembly step following that of FIG. 6;

FIG. 8 is a schematic exploded side elevational view of a portion of a partially assembled battery module according to an embodiment of the present invention during an assembly step following that of FIG. 7;

FIG. 9 is a schematic exploded side elevational view of a portion of a partially assembled battery module according to an embodiment of the present invention during an assembly step following that of FIG. 8;

FIG. 10 is a schematic exploded side elevational view of a portion of an assembled battery module according to an embodiment of the present invention after the assembly step of FIG. 9; and FIG. 11 is a schematic exploded side elevational view of a portion of an assembled battery module according to a further embodiment of the present invention.

DETAILED DESCRIPTION OF THE PREFERRED EMBODIMENTS

As shown in FIGS. 1, 2, and 3, a battery module 1 includes a folded laminate sheet 21 having a current collector layer 41, a electrode layer 61, and an electrolyte layer 81 laminated together. The current collector layer 41 is referred to herein as the cathode current collector layer, and the electrode layer 61 is referred to herein as the cathode layer. In practice, the cathode current collector layer 41 is formed from a continuous current conducting web material, such as a nickel web or sheet. The cathode layer 61 is coated onto the cathode current collector layer 41 and is selected from the group of materials suited for storing ions released from an anode. The cathode layer preferably is a vanadium oxide, $V_6O_{13}$, material. The electrolyte layer 81 is a polymer electrolyte material that is coated onto the cathode layer 61. The cathode layer 61 and the electrolyte layer 81 may be cured in an electron beam curing apparatus (not shown).

The laminate sheet 21 is folded at the center to form a folded edge 23, and the top end 25 and the bottom end 27 of the laminate sheet are aligned. The laminate sheet 21 is folded into a top half 29 and a bottom half 31 such that the cathode current collector layer 41 forms a top half 43 and a bottom half 45 which are folded to face one another. The electrolyte layer 81 is on the exterior of the laminate sheet 21 and forms a top half 83 and a bottom half 85. The cathode layer 61 is mounted between the electrolyte layer 81 and the cathode current collector layer 41 and has a top half 63 between the top half of the cathode current collector layer 43 and the top half of the electrolyte layer 83, and a bottom half 65 between the bottom half of the cathode current collector layer 45 and the bottom half of the electrolyte layer 85. While forming the folded edge 23 causes compression and tension in layers of the laminate sheet 21, these forces may be minimized by using relatively thin cathode current collector layers 41, cathode layers 61, and electrolyte layers 81.

A spacer means 100 for current collection from the cathode layer 61 is provided between the top and bottom ends 25 and 27 of the laminate sheet 21. The spacer means 100 includes a top surface 103 and a bottom surface 104 which contact the top and bottom halves 43 and 45 of the cathode current collector layer 41 along a top contacting portion 47 and a bottom contacting portion 49 of the top and bottom halves 43 and 45 by the top and bottom ends 25 and 27 of the laminate sheet 21. As shown in FIG. 2, when the spacer means 100 is placed between the top and bottom ends 25 and 27 of the laminate sheet 21, a compressible space 33 is formed between the top and bottom halves 29 and 31 of the laminate sheet 21. In FIG. 2, the top and bottom halves 29 and 31 are not compressed around the spacer means 100, and a top outer surface 87 and a bottom outer surface 91 of the electrolyte layer 81 are substantially flat or planar.

The spacer means 100 has a predetermined thickness. The top and bottom halves 29 and 31 of the laminate sheet 21 are compressed around the top surface 103 and the bottom surface 104 of the spacer means such that the laminate sheet is deformed. The deformed laminate sheet 21 includes a raised portion 88 and a recessed portion 89 of the top outer surface 87 of the electrolyte layer 81 that have dimensions that are a function of the predetermined thickness of the spacer means 100. The deformed laminate sheet 21 also includes a raised portion 92 and a recessed portion 93 of the bottom outer surface 91 of the electrolyte layer 81 that have dimensions that are a function of the predetermined thickness of the spacer means 100. Further, the laminate sheet 21 is compressed such that the top contacting portion 47 and the bottom contacting portion 49 of the top and bottom halves 43 and 45 of the cathode current collector layer 41 are brought into tight contact with the top and bottom surfaces 103 and 104 of the spacer means 100 and a top facing portion 51 and a bottom facing portion 53 of the top and bottom halves of the cathode current collector layer are brought into tight contact with one another. Preferably, the laminate sheet 21 is folded around the spacer means 100 such that it is symmetrical about a plane (not shown) passing through the folded edge 23, between the top and bottom contacting portions 47 and 49, and a central axis (not shown) of the spacer means.

The spacer means 100 also includes a rear portion 105 for contacting additional block spacer means 120 for current collection, which is referred to herein as cathode block spacer means. The cathode block spacer means 120 have predetermined thicknesses. The cathode block spacer means 120 facilitate electrical connections with the spacer means 100. The top and bottom ends 25 and 27 of the laminate sheet 21 may be separated from contact with the cathode block spacer means 120 by top and bottom gaps 35 and 37. The cathode block spacer means 120 and the spacer means 100 may be formed as a single piece.

The spacer means 100 preferably extends substantially across the transverse width of the laminate sheet 21. When the laminate sheet 21 is compressed around the spacer means 100 such that the laminate sheet is deformed, the top and bottom raised portions 88 and 92 and the top and bottom recessed portions 89 and 93 are formed in the top and bottom outer surfaces 87 and 89 of the electrolyte layer 81 across substantially the entire transverse width of the laminate sheet. The cathode block spacer means 120 preferably also extends across the entire transverse width of the laminate sheet 21 to facilitate formation of an electrical connection between the cathode block spacer means and the spacer means. If preferred, however, the spacer means 100 and the cathode block spacer means 120 may comprise segments and not extend across the entire width of the laminate sheet 21 (not shown). The spacer means 100 and the cathode block spacer means 120 are made of a conductive material, preferably copper.

A first portion 133 of a top opposite electrode layer 131 and a first portion 153 of a bottom opposite electrode layer 151, the top opposite electrode layer and the bottom opposite electrode layer being of opposite polarity from the electrode layer 61 of the laminate sheet 21, are applied to the top and bottom outer surfaces of the electrolyte layer 87 and 91 in positions corresponding to the positions of the top and bottom recessed portions 89 and 93. The top and bottom electrode layers 131 and 151 are referred to herein as top and bottom anode layers, respectively. The top and bottom anode layers 131 and 151 preferably have predetermined thicknesses substantially equal to one half of the thickness of the spacer means 100, and the sum of the thicknesses of the top and bottom anode layers are substantially equal to the thickness of the spacer means. The top and bottom anode layers 131 and 151 are formed by coating an anode material onto both sides of webs or sheets of an anode current collector material (not shown). The anode material is preferably lithium because of its position in the electromotive series. The anode current collector material is preferably a conductive web or sheet material, such as a copper web or sheet material.

As shown in FIG. 3, when the laminate sheet 21 is compressed around the spacer means 100 as described above, the first portion 133 of the top anode layer 131 is received in the recessed portion 89 of the top outer surface 87 of the electrolyte layer 81 and forms a substantially continuous surface 135 with the raised portion 88. Similarly, the first portion 153 of the bottom anode layer 151 is received in the recessed portion 93 of the bottom outer surface 91 of the electrolyte layer 81 and forms a substantially continuous surface 155 with the raised portion 92. A small gap 137 may be formed between the first portion 133 and the raised portion 88 and a small gap 157 may be formed between the first portion 153 and the raised portion 92. The sum of the thicknesses of the materials making up that portion of the battery module 1 between the substantially continuous surface 135 to the substantially continuous surface 155 is substantially constant. The laminate sheet 21 is preferably compressed around the spacer means 100 such that the height difference between the raised portion 88 and the recessed portion 89 is equal to the height difference between the raised portion 92 and the recessed portion 93 and such that the substantially continuous surfaces 135 and 155 are substantially flat or planar.

A second portion 139 of the top anode layer 131 and a second portion 159 of the bottom anode layer 151 extend past the folded edge 23 of the laminate sheet 21. The anode block spacer means 200 and a tab spacer means 220, each having predetermined thicknesses, are disposed on opposite sides of the second portion 139 and the second portion 159 of the top and the bottom anode layers 131 and 151. In operation, the anode block spacer means 200 and a tab spacer means 220 collect current from and electrically connect the anode layers. As shown for example, in FIG. 1, the anode block spacer means 200 and the tab spacer means 220 preferably extend across substantially the entire transverse width of the top and bottom anode layers 131 and 151. The tab spacer means 220 includes a tab 221. The tab 221 may extend across only a portion of the width of the top and bottom anode layers 131 and 151. The tab spacer means 220 facilitates forming an outside electrical connection with the top and bottom anode layers 131 and 151 and the anode block spacer means 200. The anode block spacer means 200 includes a number of different thickness blocks 201,202. In alternative configurations (not shown), the anode block spacer means extend across only a desired portion of the transverse width of the top and the bottom anode layers, or the anode block spacer means are formed with recesses for receiving tabs of the tab spacer means. The anode block spacer means 200 and the tab spacer means 220 may be made out of copper or any other suitably conductive material.

In practice, a larger, higher voltage (and/or greater surface area) battery can be constructed by repeated stacking of folded laminate 21, anode layer 131 and spacers before applying the upper laminate sheet 231.

A top end laminate sheet 231 and a bottom end laminate sheet 261 are applied over the top and bottom anode layers 131 and 151 on the substantially continuous surfaces 135 and 155. Like the laminate sheet 21, the top end laminate sheet 231 includes an electrolyte layer 236, an electrode layer 241, and a current collector layer 246. Similarly, the bottom end laminate sheet 261 includes an electrolyte layer 266, an electrode layer 271, and a current collector layer 276. The electrode layers 236 and 266 of the top and the bottom end laminate sheets 231 and 261 and the current collector layers 246 and 276 of the top and the bottom end laminate sheets are herein referred to as the cathode layers and cathode current collector layers, respectively. When the top and bottom end laminate sheets 231 and 261, the top and bottom anode layers 131 and 151, and the folded sheet laminate 21 are compressed around the spacer means 100, the top end laminate sheet 231 contacts the surface 135, and the bottom end laminate sheet contacts the surface 155. A rear end 232 of the top end laminate sheet 231 and a rear end 262 of the bottom end laminate sheet 261 are aligned with the top and bottom ends 25 and 27 of the folded laminate sheet 21 and are separated from contact with the cathode block spacer means 120 by the top and bottom gaps 35 and 37. The top and bottom end laminate sheets 231 and 261 are each a constant thickness. When the top and bottom end laminate sheets 231 and 261 are applied on the substantially continuous surfaces 135 and 155, the sum of the thicknesses of the materials making up that portion of the battery module 1 between the cathode current collector layers 246 and 276 of the top and the bottom end laminates 231 and 261 is substantially constant. Further, if the substantially continuous surfaces 135 and 155 are substantially flat or planar, the top and bottom end laminates 231 and 261 are preferably applied on the substantially flat or planar and substantially continuous surfaces such that the cathode current collector layers 246 and 276 are substantially flat or planar.

An anode spacer insulator means 300 surrounds the tab spacer means 220 and the anode block spacer means 200. It should be noted that the tab 221 of the tab spacer means 220 extends through holes 301, shown as dotted lines in FIG. 3, in the anode spacer insulator means. The anode spacer insulator means 300 is preferably formed of a pliable, electrical insulator and extends around the vertically stacked tab spacer means 220 and anode block spacer means 200. As shown, for example, in FIGS. 5 and 8, the anode spacer insulator means 300 includes a top end portion 302 and a bottom end portion 303. The top end portion 302 is mounted between the top anode layer 131 and the top end laminate sheet 231. The bottom end portion 303 is mounted between the bottom anode layer 151 and the bottom end laminate sheet 261.

An outside cathode current collector means 400 surrounds the folded laminate sheet 21, the top and bottom anode layers 131 and 151, and the top and bottom end laminate sheets 231 and 261. The outside cathode current collector means 400 contacts the cathode current collector layer 246 of the top end laminate sheet 231 and the cathode current collector layer 276 of the bottom end laminate sheet 261 as well as the spacer means 100 and the cathode block spacer means 120. As shown, for example, in FIG. 1, the outside cathode current collector means 400 may include foldable tab members 401 that are foldable back upon opposite ends of the outside cathode current collector means such that the outside cathode current collector means forms a closed loop about the components of the battery module 1. A battery module 1 may be formed with, among other components, top and bottom end laminate sheets 231 and 261, top and bottom anode layers 131 and 151, and a folded laminate sheet 21 compressed around a spacer means 100, and enclosed by an outside current collector means 400, with highly flat or planar exterior surfaces.

With reference to FIGS. 4–10, a battery module is assembled in a series of steps which are described as follows for the purpose of illustration. It should be understood, however, that the sequence of some of the steps may be altered to facilitate manufacturability. In FIG. 4, the outside current collector means 400 is shown. The bottom end laminate sheet 261 is applied to an interior portion 404 of the outside current collector means at a predetermined position on the interior portion such that the cathode current collector layer 276 of the bottom end laminate sheet contacts the interior portion.

FIG. 5 shows the bottom end portion 303 of the anode spacer insulator means 300 positioned on the bottom end laminate sheet 261. The cathode block spacer means 120 is positioned on the outside current collector means 400, separated from the end 262 of the bottom end laminate sheet 261 by the gap 37. The bottom anode layer 151 is applied, in a predetermined position, on the electrolyte layer 266 of the bottom end laminate sheet 261. The block spacer 201 is positioned between the second portion 159 of the bottom anode layer 151 and the anode spacer insulator means 300. The tab spacer means 220 is positioned on top of the second portion 159 of the bottom anode layer 151 and the block spacer 202 is positioned on top of the tab spacer means.

FIG. 6 shows the laminate sheet 21 folded at the folded edge 23 such that its ends 25 and 27 are aligned. The folded laminate sheet is prepared to applied on top of the bottom anode layer 151 so that the bottom half 31 of the laminate sheet contacts the bottom anode layer. The spacer means 100 is provided for being positioned in the space 33 between the top and bottom half 29 and 31 of the folded laminate sheet 21.

FIG. 7 shows the top anode layer 131 on the top half 29 of the folded laminate sheet 21. The block spacer 201 and the block spacer 202 and the tab spacer means 220 are positioned relative to the second portion 139 of the top anode layer 131.

The steps shown in FIGS. 6 and 7 can be repeated to build up a larger, higher-voltage module such as the battery module 1' shown in FIG. 11. The battery module 1' includes a desired number of laminate sheets 21 and associated top and bottom opposite electrode layers 131 and 151. If desired, instead of providing separate, adjacent top and bottom opposite electrode layers 131 and 151, as shown in FIG. 11, a single opposite electrode layer, preferably of approximately twice the thickness of either of the opposite electrode layers 131 or 151, may be provided.

FIG. 8 shows the anode spacer insulator means 300 surrounding the anode block spacer means 200, the tab spacer means 220, and the top and bottom anode layers 131 and 151 such that the tab 221 of the tab spacer means extends through the holes 301 in the anode spacer insulator means. Gaps 170, 171, and 172 are formed to separate the folded laminate sheet 21 and the top and bottom end laminate sheets 231 and 261 from the anode block spacer means 200 and the tab spacer means 220. The top end portion 302 of the anode spacer insulator means 300 is positioned between the top anode layer 131 and the top end laminate sheet 231 and the top end laminate sheet is applied on top of the top anode layer.

FIG. 9 shows the top and bottom end laminate sheets 231 and 261, the top and bottom anode layers 131 and 151, and the folded laminate sheet 21 compressed around the spacer means 100 such that various components of the battery module are compressed together. The spacer means 100 and the cathode block spacer means 120 are compressed together. The anode block spacer means 200, the tab spacer means 220, the second portion 139 of the top anode layer and the second portion 159 of the bottom anode layer, and the anode spacer insulator means are also compressed together. In addition to the foregoing parts of the battery module 1 being compressed together, the folded laminate sheet 21 deforms around the spacer means 21 such that the top outer surface 87 and the bottom outer surface 91 of the electrolyte layer 81 form raised portions 88 and 92 and recessed portions 89 and 93. The first portions 133 and 153 of the top and bottom anode layers 131 and 151 form, with the raised portions 88 and 92, substantially continuous and substantially flat or planar surfaces 135 and 155.

FIG. 10 shows the outside cathode current collector means 400 wrapped around various components of the battery module 1. The tabs 401 of the outside cathode current collector means 400 may be wrapped around to opposite ends of the outside cathode current collector means to encircle the various components of the battery module and hold the components in place, as shown by dashed lines.

The interior portion 404 of the outside cathode current collector contacts the cathode current collector layer 246 of the top end laminate sheet 231, the cathode current collector layer 276 of the bottom end laminate sheet 261, the spacer means 100 and the cathode block spacer means 120.

A desired number of battery modules 1 can be stacked, one on top of the other. The outside cathode current collector means 400 of one battery module 1 may be electrically connected, in series or in parallel, with another cathode current collector means (not shown) of another battery module (not shown). Similarly, the tabs 221 of one battery module 1 may be electrically connected, in series or in parallel, with other tabs (not shown) of another battery module (not shown).

In practice, stacks of fifty or more battery modules 1 may be formed by stacking battery modules one on top of the other. In such stacks, the thickness of the laminate sheet 21 and the top and bottom end laminate sheets 231 and 261 may be approximately 5.53 mils, including a cathode current collector layer 81 of approximately 0.33 mils thickness, a cathode layer 61 of approximately 4 mils thickness, and an electrolyte layer of approximately 1.2 mils thickness. The laminate sheet 21 and the top and bottom end laminate sheets 231 and 261 may be obtained from a common source of laminate material (not shown). The top and bottom anode layers 131 and 151 may be approximately 3.0 mils thick and may be obtained from a common source of anode material (not shown). The spacer means 100 may be approximately 6 mils thick. The cathode block spacer means 120 may be approximately 11.06 mils thick. The tab spacer means 220 may be approximately 3.0 mils thick, and the block spacers 201 and 202 may be approximately 5.0 mils and 2.53 mils thick, respectively. The anode spacer insulator means 300 may be approximately 0.5 mils thick. The outside cathode current collector means 400 may be approximately 0.33 mils thick.

Desired power characteristics of the battery module 1 may also be provided for specific applications by, for instance, by varying the length and width of the battery module 1 to attain a particular area for ion exchange between anode and cathode layers.

In another embodiment of the above-described battery, the anodic and the cathodic components of the battery module may be reversed. For example, the laminates 21, 231, and 261 may be formed with anode layers 61, 241, and 271, respectively, and the top and bottom electrode layers 131 and 151 may be top and bottom cathode layers, respectively. As noted above, however, the preferred embodiment uses cathode layers 61, 241, and 271 and top and bottom anode layers 131 and 151. The preferred embodiment facilitates the use of less anode material.

The foregoing has described the principles, preferred embodiments and modes of operation of the present invention. However, the invention should not be construed as limited to the particular embodiments discussed. Instead, the abovedescribed embodiments should be regarded as illustrative rather than restrictive, and it should be appreciated that variations may be made in those embodiments by workers skilled in the art without departing from the scope of present invention as defined by the following claims.

What is claimed is:

1. A battery module, comprising:
   current collector spacer means;
   a first laminate having a first electrode side having a first polarity and a polymer electrolyte side, the first laminate being compressed around the spacer means such the first electrode side contacts the spacer means and a raised area and a recessed area are formed on the polymer electrolyte side; and a second electrode, the second electrode having a second polarity, the second electrode having first and second sides, the second electrode being received in the recessed area such that the first side of the second electrode contacts the polymer electrolyte side.

2. The battery module of claim 1, further comprising a second laminate having a third electrode side having the first polarity and a polymer electrolyte side, the polymer electrolyte side of the second laminate contacting the raised area and the second side of the second electrode, and means for electrically connecting the spacer means and the third electrode side.

3. The battery module of claim 1, wherein the first laminate is folded in half and compressed around the spacer means such that top and bottom halves of the first laminate are formed and a raised area and a recessed area are formed on the polymer electrolyte side of the top and bottom halves of the first laminate, and a bottom second electrode is provided and is received in the recessed area of the bottom half of the first laminate.

4. The battery module of claim 3, further comprising means for electrically connecting the top and the bottom second electrodes.

5. The battery module of claim 3, further comprising a top and a bottom second laminate, each having a third electrode side having the first polarity and a polymer electrolyte side, the top and bottom polymer electrolyte sides of the top and bottom second laminates contacting the top and bottom raised areas and the second side of the top and bottom second electrodes, and means for electrically connecting the spacer means and the top and bottom third electrode sides.

6. The battery module of claim 3, wherein the combined thicknesses of the top and bottom second electrodes is substantially the same as the thickness of the spacer 7. The battery module of claim 5, wherein the third electrode sides of the top and the bottom third electrodes are substantially flat or planar.

8. The battery module of claim 1, wherein the first electrode side is cathodic and the second electrode is anodic.

9. The battery module of claim 1, wherein the first electrode side is anodic and the second electrode is cathodic.

10. The battery module of claim 1, wherein the raised portion is raised above the recessed portion a distance substantially equal to the thickness of the second electrode.

11. A battery module, comprising:

spacer means for current collection;

folded laminate means for being folded such that an end portion of a top and a bottom half of the folded laminate means contact a portion of the spacer means, the folded laminate means including a folded current collector layer, a portion of a top and a bottom half of the folded current collector layer contacting the portion of the spacer means, and a folded electrolyte layer, the folded current collector layer and the folded electrolyte layer encompass a folded electrode layer, the folded electrolyte layer having a top and a bottom half, an outer surface of each half of the folded electrolyte layer having a raised portion, the raised portion corresponding to the location of the spacer means between the two halves of the folded laminate means, and a recessed portion;

a top and a bottom opposite electrode layer, the top and the bottom opposite electrode layers being of opposite polarity to the folded electrode layer, first portions of the top and the bottom opposite electrode layers being received in the recessed portion of the top and the bottom halves of the folded electrolyte layer to form a top and a bottom substantially planar surface with the raised portion of the top and the bottom halves of the folded electrolyte layer;

a top end laminate means contacting the top substantially planar surface, the top end laminate means including an electrolyte layer in contact with the top substantially planar surface and an outer surface; and a bottom end laminate means contacting the bottom substantially planar surface, the bottom end laminate means including an electrolyte layer in contact with the bottom substantially planar surface and an outer surface.

12. The battery module of claim 11, further comprising an outside current collector means for contacting the outer surfaces of the top end laminate means and the bottom end laminate means.

13. The battery module of claim 12, wherein the outside current collector means includes means for at least partially surrounding the first and second end laminate means, the first and second opposite electrode layers, and the folded laminate means.

14. The battery module of claim 11, wherein the top and the bottom opposite electrode layers each have a second portion extending outwardly from the folded laminate means, and opposite electrode spacer means for collecting current from the first and the second opposite electrode layers are provided, the opposite electrode spacer means being adapted to contact the second portions of the top and bottom opposite electrode layers.

15. The battery module of claim 11, wherein the battery module is adapted to be electrically connected to one or more additional battery modules.

16. The battery module of claim 11, wherein the top end laminate means further includes an electrode layer, the bottom end laminate means further includes an electrode layer, the first portions of the top and bottom opposite electrode layers are in ion exchange with the folded electrode current collector layer, the electrode layer of the top end laminate means, and the electrode layer of the bottom end laminate means, and power characteristics of the battery module vary directly with the size of the first portions of the top and bottom opposite electrode layers.

17. The battery module of claim 11, wherein the folded current collector layer, the folded electrolyte layer, and the folded electrode layer of the folded laminate means and the top and bottom opposite electrode layers associated with the folded laminate means define a battery portion, and wherein the battery module includes two or more battery portions, a top opposite electrode layer of at least one battery portion being disposed adjacent to and in contact with a bottom opposite electrode layer of another battery portion.

* * * * *